(12) United States Patent
Hata

(10) Patent No.: US 11,966,651 B2
(45) Date of Patent: Apr. 23, 2024

(54) COMMUNICATION SYSTEM, NON-TRANSITORY COMPUTER-READABLE RECORDING MEDIUM STORING COMPUTER-READABLE INSTRUCTIONS FOR SERVER, AND NON-TRANSITORY COMPUTER-READABLE RECORDING MEDIUM STORING APPLICATION PROGRAM INCLUDING COMPUTER-READABLE INSTRUCTIONS FOR TERMINAL DEVICE FOR DISPLAYING NOTIFICATION INFORMATION RELATED TO HISTORY INFORMATION INDICATING USAGE HISTORY OF COMMUNICATION DEVICE

(71) Applicant: BROTHER KOGYO KABUSHIKI KAISHA, Nagoya (JP)

(72) Inventor: Megumi Hata, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/152,235

(22) Filed: Jan. 10, 2023

(65) Prior Publication Data
US 2023/0229371 A1 Jul. 20, 2023

(30) Foreign Application Priority Data

Jan. 20, 2022 (JP) ................................ 2022-007347

(51) Int. Cl.
*G06F 3/12* (2006.01)
*H04N 1/34* (2006.01)

(52) U.S. Cl.
CPC .......... *G06F 3/1273* (2013.01); *G06F 3/1204* (2013.01); *G06F 3/121* (2013.01);
(Continued)

(58) Field of Classification Search
USPC ........................................................ 358/1.9
See application file for complete search history.

(56) References Cited

U.S. PATENT DOCUMENTS

| 10,861,082 B2 * | 12/2020 | Sugamata | ............... H04L 67/10 |
| 2012/0218605 A1 * | 8/2012 | Yamada | ............. H04N 1/00448 358/1.17 |
| 2013/0028616 A1 * | 1/2013 | Kunihiro | ............... G06F 3/1204 399/81 |

FOREIGN PATENT DOCUMENTS

JP 2018-146996 A 9/2018

* cited by examiner

*Primary Examiner* — Jacky X Zheng
(74) *Attorney, Agent, or Firm* — Scully, Scott, Murphy & Presser, PC

(57) ABSTRACT

A communication system comprising: a communication device; a server; and a terminal device. The communication device sends first history information indicating usage history of the communication device to the server and sends second history information indicating usage history of the communication device to the terminal device. In a case where the first history information is received from the communication device, the server sends first notification information related to the first history information to the terminal device. In a case where the first notification information is received from the server, the terminal device displays the first notification information on the display unit and in a case where the second history information is received from the communication device, the terminal device displays second notification information related to the second history information on the display unit.

11 Claims, 9 Drawing Sheets

(52) U.S. Cl.
CPC .......... *G06F 3/1232* (2013.01); *G06F 3/1255* (2013.01); *H04N 1/34* (2013.01)

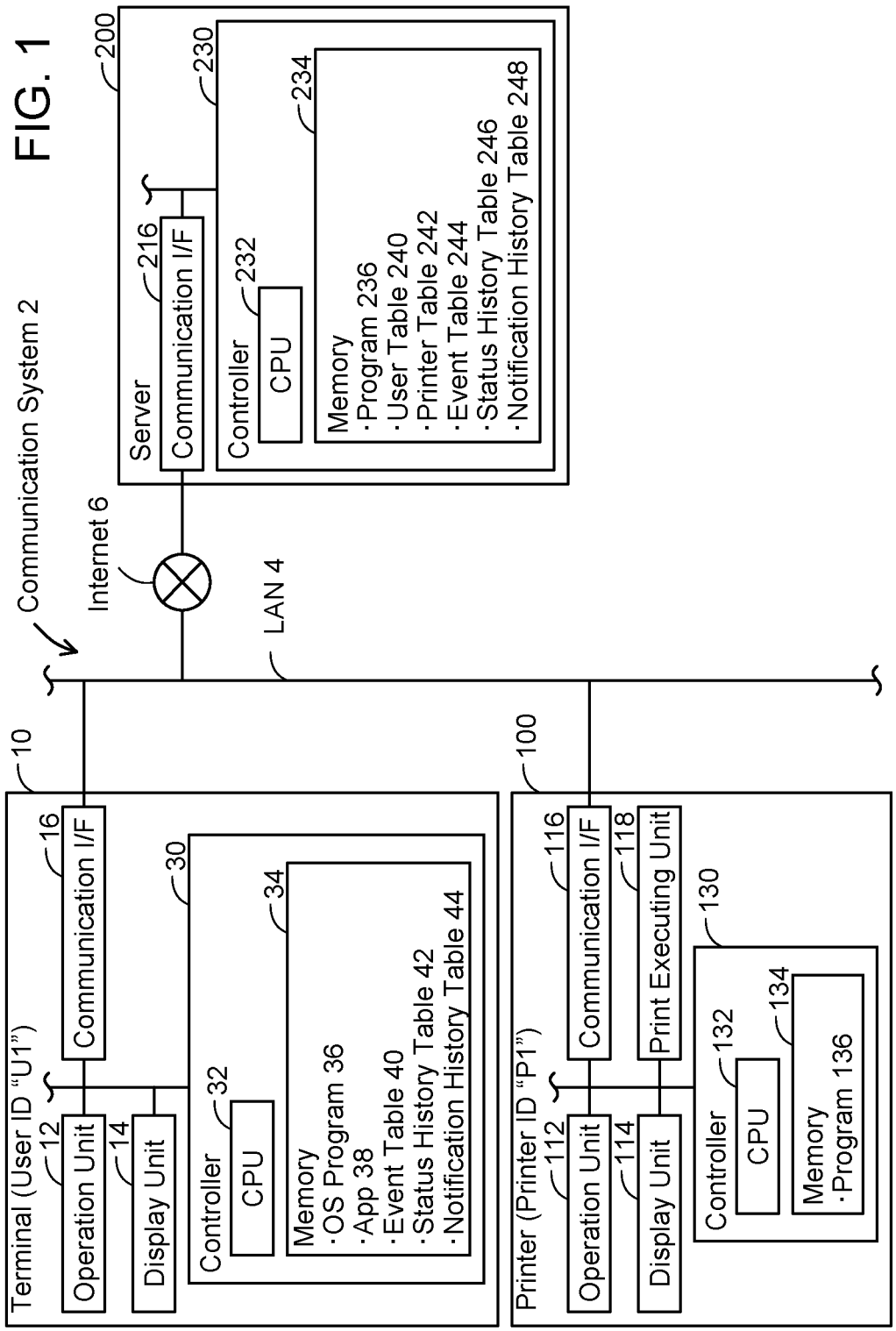

| Notification ID | Message | Event ID |
|---|---|---|
| N1 | M1 | Low |
| N2 | M2 | Empty |
| N3 | M3 | Not Genuine |
| N4 | M4 | Service_In |

42

| Item | Previous Status Information | Present Status Information |
|---|---|---|
| Remaining Amount | 50 | 20 |
| Service | Service A | Service A |
| Type | Genuine | Genuine |

44, 248

| Notification ID | Notification Means |
|---|---|
| N1 | App |
| N2 | Push |
| ... | ... |

240

| User ID | Printer ID |
|---|---|
| U1 | P1 |
| ... | ... |

242

| Printer ID | Registered Service |
|---|---|
| P1 | Service A |
| ... | ... |

244

| Notification ID | Message | Event ID |
|---|---|---|
| N1 | M1 | Low |
| N2 | M2 | Empty |
| N3 | M3 | Not Genuine |
| N4 | M4 | Service_In |
| N5 | M5 | Purchase 10 |

246

| Item | T0 | T2 | T3 | ... |
|---|---|---|---|---|
| Remaining Amount | 50 | 20 | 0 | ... |
| Service | Service A | Service A | Service A | ... |
| Type | Genuine | Genuine | Genuine | ... |

| Time | Notification ID |
|---|---|
| T1 | N1 |
| T3 | N2 |
| ... | ... |

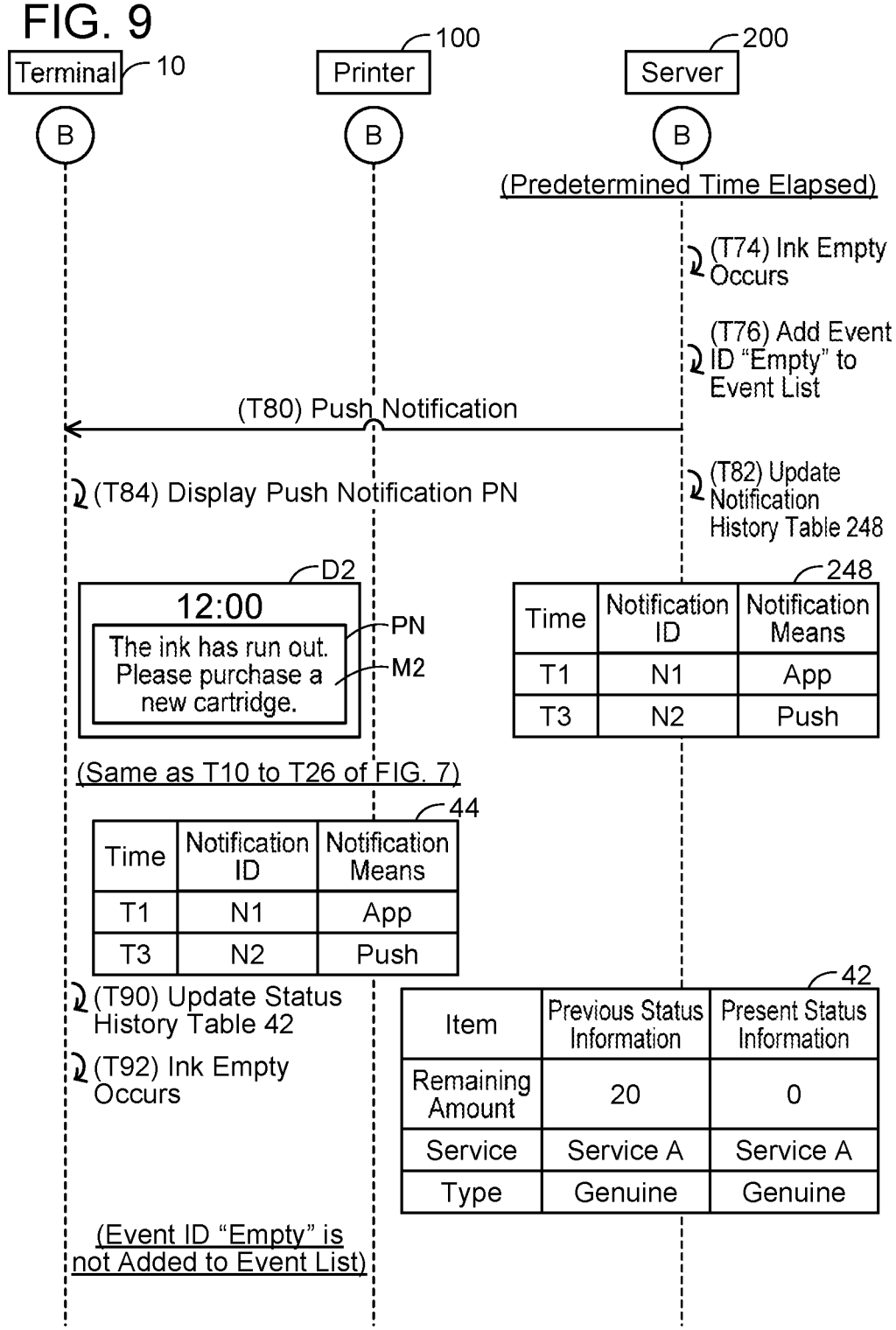

COMMUNICATION SYSTEM, NON-TRANSITORY COMPUTER-READABLE RECORDING MEDIUM STORING COMPUTER-READABLE INSTRUCTIONS FOR SERVER, AND NON-TRANSITORY COMPUTER-READABLE RECORDING MEDIUM STORING APPLICATION PROGRAM INCLUDING COMPUTER-READABLE INSTRUCTIONS FOR TERMINAL DEVICE FOR DISPLAYING NOTIFICATION INFORMATION RELATED TO HISTORY INFORMATION INDICATING USAGE HISTORY OF COMMUNICATION DEVICE

REFERENCE TO RELATED APPLICATION

This application claims priority to Japanese Patent Application No. 2022-007347 filed on Jan. 20, 2022. The entire content of the priority application is incorporated herein by reference.

BACKGROUND ART

A system including a management server, a label printer, and a client terminal is known. The label printer sends log data to the management server. The management server sends a notification to the client terminal according to the log data.

DESCRIPTION

The technology above completely lacks the perspective of sending a notification from the label printer to the client terminal. The disclosure herein provides a technology that enables improvement in convenience for a user of a terminal device.

A communication system is disclosed herein. The communication system may comprise a communication device, a server, and a terminal device. The communication device may comprise a first controller, and the first controller may be configured to send first history information indicating usage history of the communication device to the server; and send second history information indicating usage history of the communication device to the terminal device. The server may comprise a second controller, and the second controller may be configured to in a case where the first history information is received from the communication device, send first notification information related to the first history information to the terminal device. The terminal device may comprise a display unit and a third controller, and the third controller may be configured to in a case where the first notification information is received from the server, display the first notification information on the display unit; and in a case where the second history information is received from the communication device, display second notification information related to the second history information on the display unit.

According to the configuration above, the terminal device displays the first notification information when receiving the first notification information from the server. Additionally, the terminal device also displays the second notification information when receiving the second history information from the communication device. Thus, the terminal device can display notification information both when receiving information from the server and when receiving information from the communication device. The terminal device can therefore promptly display the notification information. Convenience for a user of the terminal device thus can be improved.

A non-transitory computer-readable recording medium storing computer-readable instructions for a server is also disclosed herein. The computer-readable instructions, when executed by a processor of the server, may cause the server to in a case where first history information indicating usage history of a communication device is received from the communication device, send first notification information related to the first history information to a terminal device, wherein in a case where the first history information satisfying a predetermined notification condition is received from the communication device without receiving notification display information from the terminal device, the first notification information is sent to the terminal device, in a case where the first history information satisfying the predetermined notification condition is received from the communication device after the notification display information has been received from the terminal device, the first notification information is not sent to the terminal device, and the notification display information is sent from the terminal device to the server in a case where second notification information related to second history information is displayed on the terminal device in response to second history information being sent from the communication device to the terminal device, wherein the second history information indicates usage history of the communication device and satisfies the predetermined notification condition.

According to the configuration above, the server sends the first notification information to the terminal device when receiving the first history information from the communication device without receiving the notification display information from the terminal device. As a result, the first notification information is displayed at the terminal device. On the other hand, the server does not send the first notification information to the terminal device even when receiving the first history information from the communication device after having received the notification display information from the terminal device. Thus, the display of the first notification information indicating the same contents as the already displayed second notification information can be suppressed. Convenience for the user of the terminal device can thus be improved.

A non-transitory computer-readable recording medium storing an application program including computer-readable instructions for a terminal device is also disclosed herein. The terminal device may comprise a display unit and a processor. In a case where first notification information is received from a server, the terminal device may display the first notification information on the display unit, the first notification information may be sent from the server to the terminal device in response to first history information being sent from a communication device to the server, wherein the first history information indicates usage history of the communication device and satisfies a predetermined notification condition. The computer-readable instructions, when executed by the processor, may cause the terminal device to: in a case where second history information indicating usage history of the communication device is received from the communication device, display second notification information related to the second history information on the display unit, wherein in a case where the second history information satisfying the predetermined condition is received from the communication device without receiving the first notification information from the server, the second notification information is displayed on the display unit, and in a case where the second history information satisfying the predetermined notification condition is received from the communication device after the first notification information has been displayed on the display unit, the second notification information is not displayed on the display unit.

According to the configuration above, the terminal device displays the second notification information when receiving the second history information from the communication device without receiving the first notification information from the server. On the other hand, the terminal device does not display the second notification information when receiving the second history information from the communication device after having displayed the first notification information. Thus, the display of the second notification information indicating the same contents as the already displayed first notification information can be suppressed. Convenience for the user of the terminal device can thus be improved.

A non-transitory computer-readable recording medium storing computer-readable instructions for the server above, a server itself implemented by the computer-readable instructions above, and a method performed by the server are also novel and useful. A non-transitory computer-readable recording medium storing the application program for the terminal device, a terminal device itself implemented by the application program above, and a method performed by the terminal device are also novel and useful.

FIG. 1 illustrates a configuration of a communication system.

FIG. 2 illustrates contents of tables.

FIG. 9 illustrates a sequence diagram continued from FIG. 8.

CONFIGURATION OF COMMUNICATION SYSTEM; FIG. 1

Figure 3:
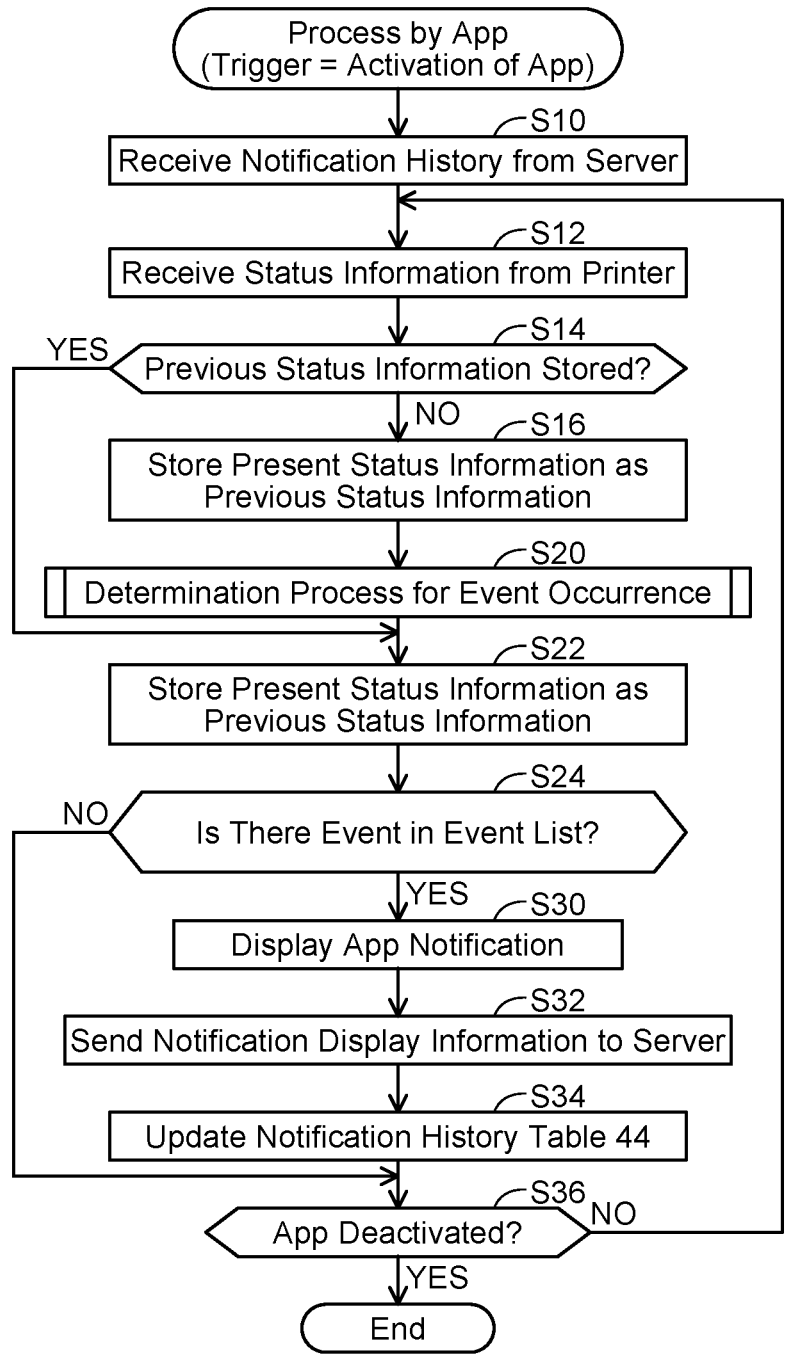
FIG. 3 illustrates a flowchart of a process performed according to an application program of a terminal.

As illustrated in FIG. 1, a communication system 2 comprises a terminal 10, a printer 100, and a server 200. The terminal 10 and the printer 100 are connected to a local area network (LAN) 4 and are communicable with each other via the LAN 4. The LAN 4 and the server 200 are connected to the internet 6. Thus, the devices 10, 100 and the server 200 are communicable with each other via the LAN 4 and the internet 6.

(Configuration of Terminal 10)

The terminal 10 is a portable terminal device such as a smartphone, a tablet PC, or a PDA. In a modification, the terminal 10 may be a stationary terminal device. A user ID "U1" is assigned to the terminal 10. The user ID is information for identifying an application program 38, which will be described later. The terminal 10 comprises an operation unit 12, a display unit 14, a communication interface 16, and a controller 30. The units 12 to 30 are connected to a bus line (reference sign omitted). Hereinafter, interface will be abbreviated as "I/F".

The operation unit 12 is an I/F for input of various instructions to the terminal 10. The display unit 14 is a display for displaying various information. The display unit 14 is a so-called touch screen and functions also as an operation unit. The communication I/F 16 is connected to the LAN 4.

The controller 30 comprises a CPU 32 and a memory 34. The CPU 32 performs various processes according to programs 36, 38 stored in the memory 34. The memory 34 is configured of a volatile memory, a non-volatile memory, etc.

The memory 34 stores an operating system (OS) program 36 and an application program 38. Hereinafter, the OS program 36 and the application program 38 will be termed "OS 36" and "app 38", respectively. The OS 36 is a program for controlling basic operations of the terminal 10.

The app 38 is installed to the terminal 10, for example, from a server (not illustrated) set up on the internet 6 by the vendor of the OS 36. The app 38 is a program for management of various status information related to usage history of a printer (e.g., printer 100) (e.g., ink remaining amount in an ink cartridge mounted in the printer 100, etc.). Although details will be described later, the app 38 determines whether an event (e.g., "Low ink" indicating that an ink remaining amount is low, etc.) has occurred at the printer 100 based on status information while the app 38 is running. In a case where the app 38 determines that an event has occurred, the app 38 displays a notification indicating the occurrence of the event on the display unit 14. Hereinafter, this notification will be termed "app notification".

The memory 34 further stores an event table 40, a status history table 42, and a notification history table 44. The tables 40 to 44 are stored into the memory 34 by the app 38. Details on contents of the tables 40 to 44 will be described later with reference to FIG. 2.

(Configuration of Printer 100)

The printer 100 is a peripheral device (e.g., a peripheral device of the terminal 10) configured to execute a print function. In a modification, the printer 100 may be a multifunctional device configured to execute a scan function, a facsimile function, etc. in addition to the print function. A printer ID "P1" for identifying the printer 100 is assigned to the printer 100. The printer 100 comprises an operation unit 112, a display unit 114, a communication I/F 116, a print executing unit 118, and a controller 130. The units 112 to 130 are connected to a bus line (reference sign omitted).

The operation unit 112 is an I/F for input of various instructions to the printer 100. The display unit 114 is a display for displaying various information. The display unit 114 is a so-called touch screen and functions also as an operation unit. The communication I/F 116 is connected to the LAN 4. The print executing unit 118 comprises a print mechanism of inkjet scheme. In a modification, the print executing unit 118 may comprise a print mechanism of different scheme from the inkjet scheme, for example, of laser scheme.

The controller 130 comprises a CPU 132 and a memory 134. The CPU 132 performs various processes according to a program 136 stored in the memory 134. The memory 134 is configured of a volatile memory, a non-volatile memory, etc.

(Configuration of Server 200)

The server 200 is a server for management of various status information related to usage history of a printer (e.g., printer 100). The server 200 is set up on the internet 6 by the vendor of the printer 100. In a modification, the server 200 may be set up on the internet 6 by a vendor different from the vendor of the printer 100. In another modification, the vendor of the printer 100 may not prepare hardware of the server 200 on its own and may use an environment provided by an external could computing service. In this case, the vendor of the printer 100 may prepare a program (i.e., software) for the server 200 and implement the server 200 by introducing it to the environment above.

The server 200 determines whether an event has occurred at the printer 100 based on status information received from the printer 100. In a case where the server 200 determines that an event has occurred, the server 200 can send a notification indicating the occurrence of the event to the terminal 10. As a result, the notification indicating the occurrence of the event is displayed at the terminal 10. Hereinafter, this notification will be termed "push notification".

The server 200 comprises a communication I/F 216 and a controller 230. The units 216, 230 are connected to a bus line (reference sign omitted). The communication I/F 216 is connected to the internet 6.

The controller 230 comprises a CPU 232 and a memory 234. The CPU 232 performs various processes according to a program 236 stored in the memory 234. The memory 234 is configured of a volatile memory, a non-volatile memory, etc.

The memory 234 further stores a user table 240, a printer table 242, an event table 244, a status history table 246, and a notification history table 248. Details on contents of the tables 240 to 248 will be described later with reference to FIG. 2.

As described, in the present embodiment, both the app 38 and the server 200 manage various status information related to usage history of the printer 100, and an app notification or a push notification is displayed at the terminal 10 based on the status information. The present embodiment provides a technology that can allow for suitable display of a notification at the terminal 10 in such a situation.

(Contents of Tables; FIG. 2)

Referring to FIG. 2, contents of the tables 40 to 44 stored in the memory 34 of the terminal 10 and the tables 240 to 248 stored in the memory 234 of the server 200 will be described.

The event table 40 indicates a list of events for which the app 38 can display an app notification. The event table 40 stores notification IDs, messages, and event IDs in association with each other. Each notification ID is information for identifying a notification. Each message is a text indicating particulars of an event. Each event ID is information for identifying an event. The respective information in the event table 40 are immutable information installed to the terminal 10 along with the app 38 and are not updated in the course of use of the app 38. In a modification, the terminal 10 may receive a part of information in the event table 244, which will be described later, from the server 200 to update the event table 40.

An event ID "Low" identifies an event that the ink remaining amount in the ink cartridge currently mounted in the printer 100 is low (e.g., an event that the ink remaining amount is equal to or less than 20%). An event ID "Empty" identifies an event that the ink remaining amount in the ink cartridge currently mounted in the printer 100 is zero. It should be noted that the present embodiment describes an exemplary case in which only a single ink cartridge (e.g., an ink cartridge containing black ink) is mounted in the printer 100. An event ID "NotGenuine" identifies an event that the ink cartridge currently mounted in the printer 100 is not the genuine ink cartridge provided by the vendor of the printer 100. An event ID "Service_In" identifies an event that the printer 100 is designated as a printer that is to receive a predetermined service.

The status history table 42 indicates a history of status information of the printer 100. Status information includes plural pieces of information corresponding to a plurality of status items (e.g., remaining amount, service, type). The status history table 42 stores previous status information and present status information in association each other. These status information are stored in the status history table 42 during the process of FIG. 3, which will be described later. The item of remaining amount is for indicating the ink remaining amount in the ink cartridge currently mounted in the printer 100. The item of service is for indicating a service the printer 100 subscribes to. The item of type is for indicating the type of ink cartridge currently mounted in the printer 100 (i.e., genuine or non-genuine).

The notification history table 44 indicates a history of notifications executed (i.e., displayed) at the terminal 10. The notification history table 44 stores times at which respective notifications were executed, notification IDs, and notification means in association with each other. These information are stored into the notification history table 44 during the process of FIG. 3, which will be described later. Each notification ID is information for identifying a notification. Each notification means indicates either one of: "App" indicating that an app notification has been executed or "Push" indicating that a push notification has been executed.

Next, contents of the tables 240 to 248 in the server 200 will be described. The user table 240 indicates a list of information on users of respective terminals including the terminal 10 (i.e., users of respective printers including the printer 100). The user table 240 stores user IDs and printer IDs in association with each other. In response to accepting a registration instruction from the user of the terminal 10 or the like, the server 200 stores a user ID and a printer ID in the user table 240.

The printer table 242 indicates a list of information related to respective printers including the printer 100. The printer table 242 stores printer IDs and registered services in association with each other. In response to accepting a registration instruction from the user of the terminal 10 or the like, the server 200 stores a printer ID and a registered service in the printer table 242. Each registered service indicates a service that the user subscribes to among a plurality of services the vendor of the printer 100 can provide. This service is, for example, a flat-rate (monthly basis) printing service, an automatic shipping service for ink cartridge, or the like.

The event table 244 indicates a list of events for which the server 200 can send a push notification. The event table 244 is the same as the event table 40 except that it further includes information associated with a notification ID "N5". The respective information in the event table 244 are immutable information and are not updated in the course of the server 200 performing processes. However, the event table 244 may be updated according to an instruction from an administrator of the server 200.

The status table 246 indicates, for each of a plurality of printers identified by the respective printer IDs stored in the printer table 242, a history of status information of the printer (e.g., the printer 100). In FIG. 2, the status history table 246 indicates information only for the single printer 100. The status history table 246 stores status information at each of plural times (e.g., T0, T2, T3). The server 200 receives status information regularly (e.g., at five-minute intervals) from each printer and updates the status history table 246. Hereinafter, an exemplary case in which the server 200 receives status information at five-minute intervals from each printer will be described.

The notification history table 248 indicates, for each of the plurality of printers identified by the respective printer IDs stored in the printer table 242, a list of notifications executed for the printer. In FIG. 2, the notification history table 248 indicates information only for the single printer 100 and the contents of which are the same as those of the notification history table 44 in the terminal 10.

(Process Performed by App; FIG. 3)

Referring to FIG. 3, a process implemented by the CPU 32 of the terminal 10 executing the app 38 will be described. For the following description on the processes of FIGS. 3 and 4, the description will be made with the app 38, not the CPU 32, as the subject of action. The process of FIG. 3 is started with activation of the app 38 as its trigger. When the app 38 is activated, a predetermined screen (e.g., a home screen) is displayed on the display unit 14 by the app 38, although this is not illustrated. Further, communication between the devices (e.g., the terminal 10, the printer 100, the server 200) is via the communication I/Fs (e.g., 16, 116, 216), and thus a phrase "via the communication I/F" will be omitted hereinafter for description on communication.

In S10, the app 38 obtains a notification history from the server 200. Specifically, the app 38 sends the server 200 a notification request to request the server 200 to send a notification history and then receives a notification history stored in the notification history table 248 from the server 200. The app 38 stores the notification history received from the server 200 in the notification history table 44. Thus, the contents of the notification history table 248 in the server 200 are synchronized with the contents of the notification history table 44 in the terminal 10.

In S12, the app 38 receives status information from the printer 100. Specifically, the app 38 sends the printer 100 a status request to request the printer 100 to send status information and then receives status information (i.e., remaining amount, service, type) from the printer 100. The app 38 stores the status information received from the printer 100 in the status history table 42 as the present status information.

In S14, the app 38 determines whether the previous status information is in the status history table 42. Specifically, in a case where the previous status information is in the status history table 42, the app 38 determines YES in S14 and proceeds to S20, whereas in a case where the previous status information is not in the status history table 42, the app 38 determines NO in S14 and proceeds to S16.

In S16, the app 38 stores the present status information in the status history table 42 (i.e., the status information received in S12) as the previous status information. That is, in this instance, the previous status information matches the present status information.

In S20, the app 38 performs an event determination process. In the event determination process, whether an event has occurred at the printer 100 is determined based on the status history table 42.

In S22, the app 38 updates the status history table 42. Specifically, the app 38 stores the present status information as the previous status information.

In S24, the app 38 determines whether an event is on an event list. The event list is a list of event IDs (e.g., "Low") that may be written in the event determination process of S20. In a case where one or more event IDs are on the event list, the app 38 determines YES in S24 and proceeds to S30.

On the other hand, in a case where no event IDs are on the event list, the app 38 determines NO in S24 and proceeds to S36. Hereinafter, an event ID on the event list will be termed "listed event ID".

In S30, the app 38 displays an app notification on the display unit 14. Specifically, the app 38 first specifies, in the event table 40, a message associated with a listed event ID listed on the event list. The app 38 then creates an app notification including the specified message and displays the created app notification on the display unit 14. As understood from the above, the process of FIG. 3 is performed while the app 38 is running. Thus, while the app 38 is running in the foreground, the app notification displayed in S30 is displayed over the aforementioned predetermined screen which is being displayed by the app. In a case where two or more event IDs are on the event list, the app 38 displays two or more app notifications corresponding to the two or more listed event IDs on the display unit 14 sequentially.

In S32, the app 38 sends the server 200 notification display information indicating that the app notification has been displayed. Specifically, the app 38 first specifies the present time (i.e., the time when the app notification was displayed). Further, the app 38 specifies a notification ID associated with the listed event ID in the event table 40. The app 38 then sends the server 200 notification display information including the user ID "U1", the specified time, and the specified notification ID.

In S34, the app 38 updates the notification history table 44. Specifically, the app 38 stores the specified time, the specified notification ID, and the notification means "App" in association with each other in the notification history table 44. After updating the notification history table 44, the app 38 deletes the listed event ID from the event list.

In S36, the app 38 determines whether an operation to deactivate the app 38 is accepted. In a case where the app 38 accepts the operation, the app 38 determines YES in S36 and ends the process of FIG. 3. On the other hand, in a case where the app 38 does not accept the operation, the app 38 determines NO in S36 and performs the sequence from S12 again. That is, the app 38 performs step S10 when activated and then repeatedly performs the sequence from S12 while the app 38 is running.

Figure 4:
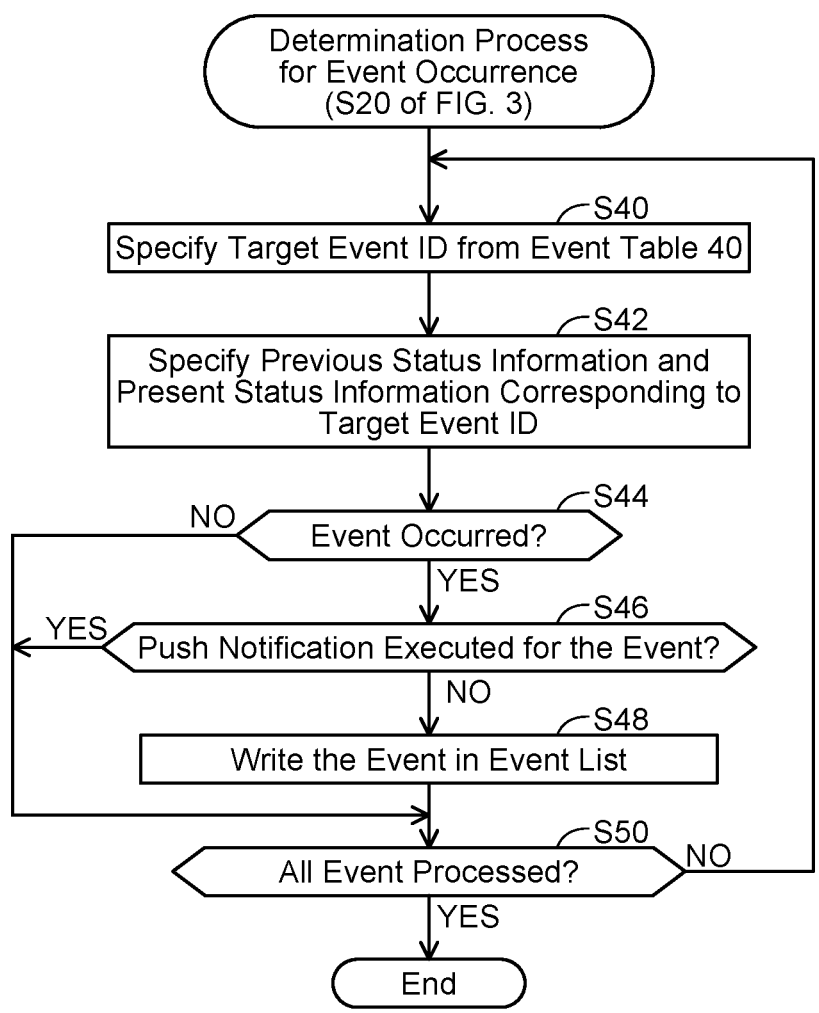
FIG. 4 illustrates a flowchart of an event determination process in S20 of FIG. 3.

(Event Determination Process; FIG. 4)

Referring to FIG. 4, the event determination process in S20 of FIG. 3 will be described. In S40 of FIG. 4, the app 38 specifies one event ID in the event table 40. Hereinafter, the event ID specified here will be termed "target event ID".

In S42, the app 38 compares the previous status information to the present status information corresponding to the target event ID, using the status history table 42. Although not illustrated in FIG. 2, an item of status information is set for each event ID in advance. For example, the item "remaining amount" is set for each of the event ID "Low" and the event ID "Empty" in advance. Further, the item "type" and the item "service" are set for the event ID "NotGenuine" and the event ID "Service_In" in advance, respectively. The app 38 first specifies an item (e.g., "remaining amount") corresponding to the target event ID (e.g., the event ID "Low"). The item corresponding to the target event ID will be termed "target item" hereinafter. The app 38 then specifies the previous status information (e.g., "50" in FIG. 2) and the present status information (e.g., "20" in FIG. 2) that are associated with the target item in the status history table 42.

In S44, the app 38 determines whether an event has occurred. Specifically, the app 38 determines that an event identified by the target event ID (which will be termed "target event" hereinafter) has occurred in a case where the previous status information specified in S42 does not satisfy an occurrence condition of the target event and the present status information specified in S42 satisfies the occurrence condition of the target event. For example, for the target event ID "Low" (i.e., the target event "Low ink"), the occurrence condition is that the ink remaining amount is equal to or less than "20". In this instance, the app 38 determines that the target event has occurred in a case where the ink remaining amount of the previous status information is greater than "20" and the ink remaining amount of the present status information is equal to or less than "20". On the other hand, the app 38 determines that the target event has not occurred, for example, in a case where both the ink remaining amount of the previous status information and the ink remaining amount of the present status information are less than "20". This is because in this situation, the app 38 has already determined that the target event had occurred in the previous event determination process. The app 38 determines YES in S44 and proceeds to S46 in the case of determining that the target event has occurred, whereas the app 38 determines NO in S44 and proceeds to S50 in the case of determining that the target event has not occurred.

Here, occurrence conditions for the other event IDs will be described. For the target event ID "Empty" (i.e., the target event "ink Empty"), the occurrence condition is that the ink remaining amount is "0". For the target event ID "NotGenuine" (i.e., the target event "non-genuine cartridge"), the occurrence condition is that the type is "non-genuine". For the target event ID "Service_In" (i.e., the target event "subscribe to service"), the occurrence condition is that the subscribed service is changed by the user.

In S46, the app 38 determines whether a push notification has been executed for the target event. Specifically, the app 38 first specifies a notification ID associated with the target event ID in the event table 40. The app 38 then determines whether the time 15 minutes before the present time, the specified notification ID, and the notification means "Push" are associated with each other in the notification history table 44. Here, "15 minutes" is set as follows. Although details will be described later, the server 200 performs an event determination process at regular intervals (see YES in S120 and S130 in FIG. 5) and sends a push notification to the terminal 10 in a case of determining that an event has occurred. In the present embodiment, the regular intervals mean every 15 minutes. Thus, in S46, it is determined whether the push notification for the target event has been executed in the time period between the present time and the time 15 minutes before the present time. In a case where the time 15 minutes before the present time, the specified notification ID, and the notification means "Push" are not associated with each other, the app 38 determines NO in S46 and then writes the target event ID into the event list in S48. Thus, an app notification for the target event is executed (YES in S24 and S30 in FIG. 3). On the other hand, in a case where the time 15 minutes before the present time, the specified notification ID, and the notification means "Push" are associated with each other, the app 38 determines YES in S46, skips S48, and then proceeds to S50. Thus, the sending of an app notification can be suppressed for the event for which the push notification has already been executed.

In S50, the app 38 determines whether the sequence from S40 to S48 has been performed for every one of event IDs in the event table 40. In a case of determining that the sequence has been performed for every one of the event IDs, the app 38 determines YES in S50 and ends the process of FIG. 4. On the other hand, in a case of determining that the sequence has not been performed for every one of the event IDs, the app 38 specifies another event ID in S40 and performs the sequence from S42 to S48.

Figure 5:
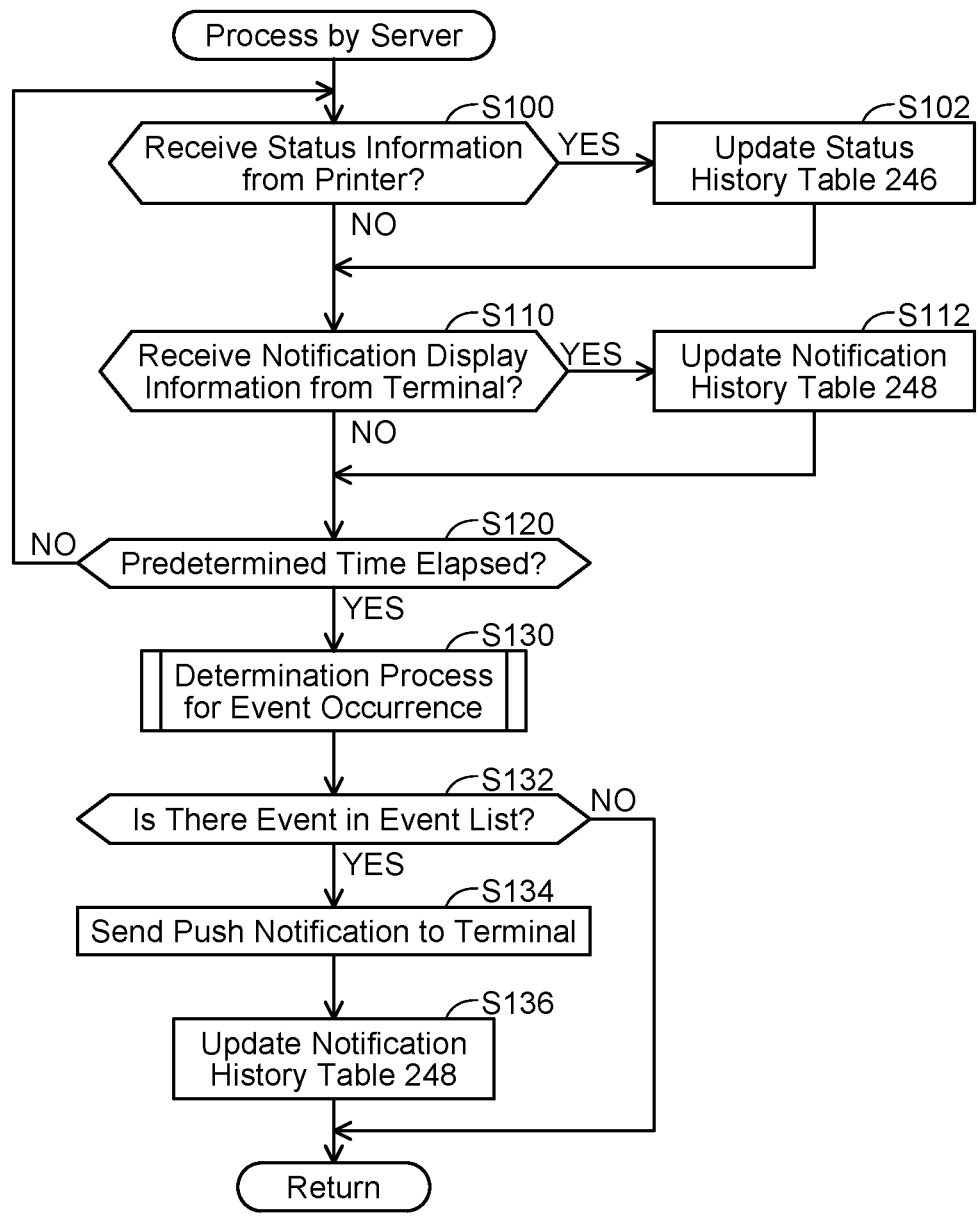
FIG. 5 illustrates a flowchart of a process performed by a server.

(Process Performed by Server 200; FIG. 5)

Referring to FIG. 5, a process performed by the CPU 232 of the server 200 will be described. The process of FIG. 5 is performed while the server 200 is on. The server 200 performs the communication of FIGS. 5 and 6 with each of one or more terminals corresponding to one or more user IDs stored in the user table 240 and each of one or more printers corresponding to one or more printer IDs stored in the printer table 242.

In S100, the CPU 232 monitors receipt of status information from a printer (e.g., the printer 100). As described, the server 200 receives status information regularly (e.g., every 5 minutes), for example, from the printer 100. In a case of receiving status information from any printer identified by a printer ID stored in the printer table 242 (e.g., from the printer 100), the CPU 232 determines YES in S100 and proceeds to S102, whereas in a case of not receiving status information from any of the printers identified by the printer IDs stored in the printer table 242, the CPU 232 determines NO in S100 and proceeds to S110. Hereinafter, a printer that is a sender of status information will be termed "target printer". The CPU 232 receives from the target printer not only status information but also a time when the status information was sent, although this is not illustrated. The status information includes the printer ID of the target printer (e.g., the printer ID "P1"), which will be termed "target printer ID" hereinafter.

In S102, the CPU 232 updates the status history table 246. Specifically, the CPU 232 first specifies the target printer ID included in the received status information. The CPU 232 then stores the time received along with the status information and the status information in association with each other in the status history table 246 corresponding to the target printer identified by the specified target printer ID.

In S110, the CPU 232 monitors receipt of notification display information from a terminal (e.g., the terminal 10). In a case of receiving notification display information from any terminal identified by a user ID stored in the user table 240 (e.g., from the terminal 10), the CPU 232 determines YES in S110 and proceeds to S112, whereas in a case of not receiving notification display information from any of terminals identified by the user IDs stored in the user table 240, the CPU 232 determines NO in S110 and proceeds to S120. Hereinafter, a terminal that is a sender of notification display information will be termed "target terminal". The notification display information includes the user ID of the target terminal (e.g., the user ID "U1"), which will be termed "target user ID" hereinafter, a time, and a notification ID (see S32 in FIG. 3).

In S112, the CPU 232 updates the notification history table 248. Specifically, the CPU 232 first specifies the target user ID included in the received notification display information. Next, the CPU 232 specifies the printer ID associated with the specified target user ID in the user table 240. The CPU 232 then stores the time included in the received notification display information, the notification ID included in the received notification display information, and the notification means "App" in the notification history table 248 corresponding to the printer identified by the specified printer ID.

In S120, the CPU 232 determines whether a predetermined time period (e.g., 15 minutes) has elapsed since a sequence from S130 onward was performed last time. In a case of determining that the predetermined time period has elapsed, the CPU 232 determines YES in S120 and proceeds to S130, whereas in a case of determining that the predetermined time period has not elapsed, the CPU 232 determines NO in S120 and returns to the monitoring steps of S100, S110, etc.

In S130, the CPU 232 performs an event determination process. In the event determination process, it is determined whether an event has occurred at the printers identified by the respective printer IDs stored in the printer table 242 based on the status history tables 246 corresponding to the printers. In the following description, an example in which whether an event has occurred at the printer 100 is determined will be described.

In S132, the CPU 232 determines whether an event is on an event list for the printer 100. For each of printers identified by the respective printer IDs stored in the printer table 242, an event list indicates a list of events at the printer. Each event list is a list of event IDs (e.g., "Low") that may be written in the event determination process of S130. In a case where one or more event IDs are on the event list for the printer 100, the CPU 232 determines YES in S132 and proceeds to S134. On the other hand, in a case where no event IDs are on the event list for the printer 100, the CPU 232 determines NO in S132 and returns to the monitoring steps of S100, S110, etc. again. Although already mentioned above, an event ID on the event list is termed "listed event ID" in the following description as well.

In S134, the CPU 232 sends a push notification to the terminal 10. Specifically, the CPU 232 first specifies a message associated with an event ID on the event list for the printer 100 in the event table 244. Next, the CPU 232 specifies the user ID "U1" associated with the printer ID "P1" of the printer 100 in the user table 240. The CPU 232 then creates a push notification including the specified message and sends the created push notification to the terminal 10 identified by the specified user ID "U1" via a server set up on the internet 6 by the vendor of the OS 36. Specifically, the CPU 232 first sends the push notification and the specified user ID "U1" to the server set up on the internet 6 by the vendor of the OS 36. This server specifies the terminal 10 using the specified user ID "U1" and sends the received push notification to the specified terminal 10. In a modification, the server 200 may send the push notification directly to the terminal 10 without the mediation of a server. As a result, the push notification is displayed on the display unit 14 of the terminal 10. In a case where two or more event IDs are on the event list for the printer 100, the CPU 232 sends two or more push notifications corresponding to the two or more listed event IDs to the terminal 10 sequentially.

As described, the app 38 repeatedly performs the event determination process while the app 38 is running on the terminal 10 (see FIGS. 3 and 4). On the other hand, the CPU 232 performs the event determination process every predetermined time period (which is 15 minutes in the present embodiment) (YES in S120, S130). Thus, while the app 38 is running on the terminal 10, it is highly probable that an app notification is executed earlier than a push notification for an event. Although details will be described later, a push notification is not sent to the terminal 10 in a case where an app notification has already been executed at the terminal 10. That is, a push notification is executed when the app 38 is not running. Thus, a push notification is displayed over a screen that is not displayed by the app 38 (e.g., over a home screen displayed by the OS 36).

In S136, the CPU 232 updates the notification history table 248 for the printer 100. Specifically, the CPU 232 first specifies the present time (i.e., the time when the push notification was sent to the terminal 10). Further, the CPU 232 specifies a notification ID associated with the listed event ID in the event table 244. The CPU 232 then stores the specified time, the specified notification ID, and the notification means "Push" in association with each other in the notification history table 248. After updating the notification history table 248 for the printer 100, the CPU 232 deletes the listed event ID from the event list for the printer 100. After completing step S136, the CPU 232 returns to the monitoring steps of S100, S110, etc. again.

Figure 6:
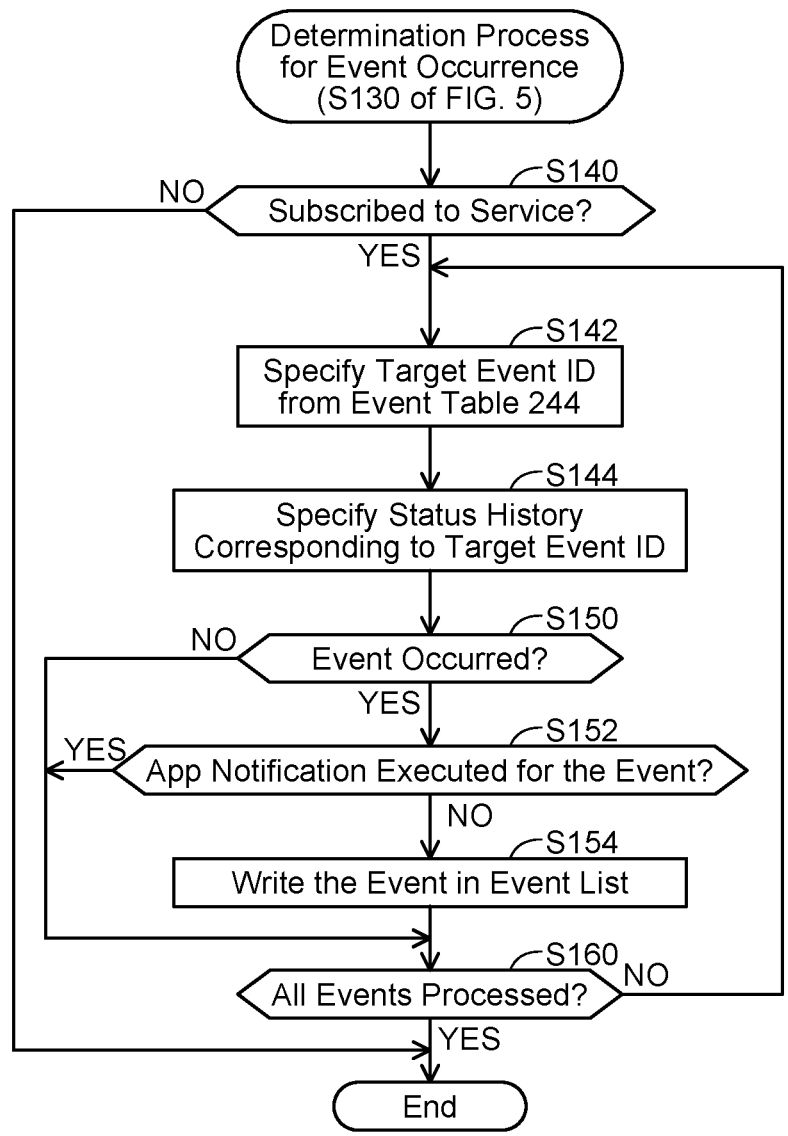
FIG. 6 illustrates a flowchart of an event determination process in S130 of FIG. 5.

(Event Determination Process; FIG. 6)

Now referring to FIG. 6, the event determination process in S130 of FIG. 5 will be described. In S140, the CPU 232 determines whether the printer 100 is registered as a printer that is to receive the service. Specifically, the CPU 232 first specifies the printer ID "P1" of the printer 100 in the printer table 242. The CPU 232 then determines whether the printer ID "P1" is associated with one or more services in the printer table 242. In a case where the printer ID "P1" is associated with one or more services in the printer table 242, i.e., in a case where the user of the printer 100 (i.e., the user of the terminal 10) subscribes to one or more services, the CPU 232 determines YES in S140 and proceeds to S142. On the other hand, in a case where the printer ID "P1" is not associated with any services in the printer table 242, the CPU 232 determines NO in S140 and ends the process of FIG. 6.

In S142, the CPU 232 specifies one event ID in the event table 244. Hereinafter, the event ID specified here will be also termed "target event ID".

In S144, the CPU 232 refers to the status history table 246 to compare status information corresponding to the target event ID. Specifically, the CPU 232 first specifies a target item in the status history table 246. The method of specifying a target item here is the same as the method of specifying a target item in S42 of FIG. 4. The CPU 232 then specifies status information associated with the target item in the status history table 246. Specifically, the CPU 232 first specifies the latest status information among plural pieces of status information at times 15 minutes or more before the present time (which will be termed "previous status information" hereinafter) and the latest status information in the status history table 246 (which will be termed "present status information"). The reason why the previous status information, not status information received one cycle before (i.e., 5 minutes before) the previous status information, is specified here is as follows.

As described, the event determination process is performed every 15 minutes and status information is received every 5 minutes. Thus, the status information one cycle before the present status information was received from the printer 100 after the event determination process had been performed last time. Therefore, whether an event has occurred may not be determined accurately. For example, a situation can be assumed where regarding the item "remaining mount", the present status information indicates "15", the status information received one cycle before (i.e., 5 minutes before) indicates "20", and the previous status information indicates "30". According to this situation, the event "Low ink" occurred after the event determination process had been performed last time (since the previous status information indicates "30" and the status information one cycle before indicates "20"). If the event determination process is performed based on the present status information and the status information one cycle before in this situation, however, it is determined that the event "Low ink" did not occur. In order to suppress the occurrence of such an incident, the CPU 232 specifies the previous status information, i.e., the latest status information at the time when the event determination process was performed last time.

In S150, the CPU 232 determines whether an event has occurred. Specifically, in a case where the previous status information does not satisfy the occurrence condition of target event identified by the target event ID and the present status information satisfies the occurrence condition of the target event, the CPU 232 determines that the target event has occurred. The CPU 232 determines YES in S150 and proceeds to S152 in the case of determining that the target event has occurred, whereas the CPU 232 determines NO in S150 and proceeds to S160 in a case of determining that the target event has not occurred. Although the depiction is omitted in FIG. 2, the server 200 stores the number of ink cartridge purchases in the printer table 242 in association with the printer ID and the registered service. For a target event ID "Purchase10" (i.e., a target event "the tenth purchase of cartridge"), its occurrence condition is that the number of purchases of cartridge is "10".

In S152, the CPU 232 determines whether an app notification has been executed for the target event. Specifically, the CPU 232 first specifies a notification ID associated with the target event ID in the event table 244. The CPU 232 then determines whether the time 15 minutes before the present time, the specified notification ID, and the notification means "App" are associated with each other in the notification history table 248. The reason for "15 minutes" here has already been described in connection with S46 in FIG. 3. In a case where the time 15 minutes before the present time, the specified notification ID, and the notification means "App" are not associated with each other, the CPU 232 determines NO in S152 and then writes the target event ID into the event list for the printer 100 in S154. On the other hand, in a case where the time 15 minutes before the present time, the specified notification ID, and the notification means "App" are associated with each other, the CPU 232 determines YES in S152, skips S154, and proceeds to S160. In this way, the execution of the push notification is suppressed for the event for which the app notification has been already executed.

In S160, the CPU 232 determines whether the sequence from S142 to S154 has been performed to every one of the event IDs in the event table 244. In a case where the sequence has been performed to every one of the event IDs, the CPU 232 determines YES in S160 and ends the process of FIG. 6. On the other hand, in a case where the sequence has not been performed to all the event IDs yet, the CPU 232 specifies another event ID in S142 and performs the sequence from S144 to S154.

Figure 7:
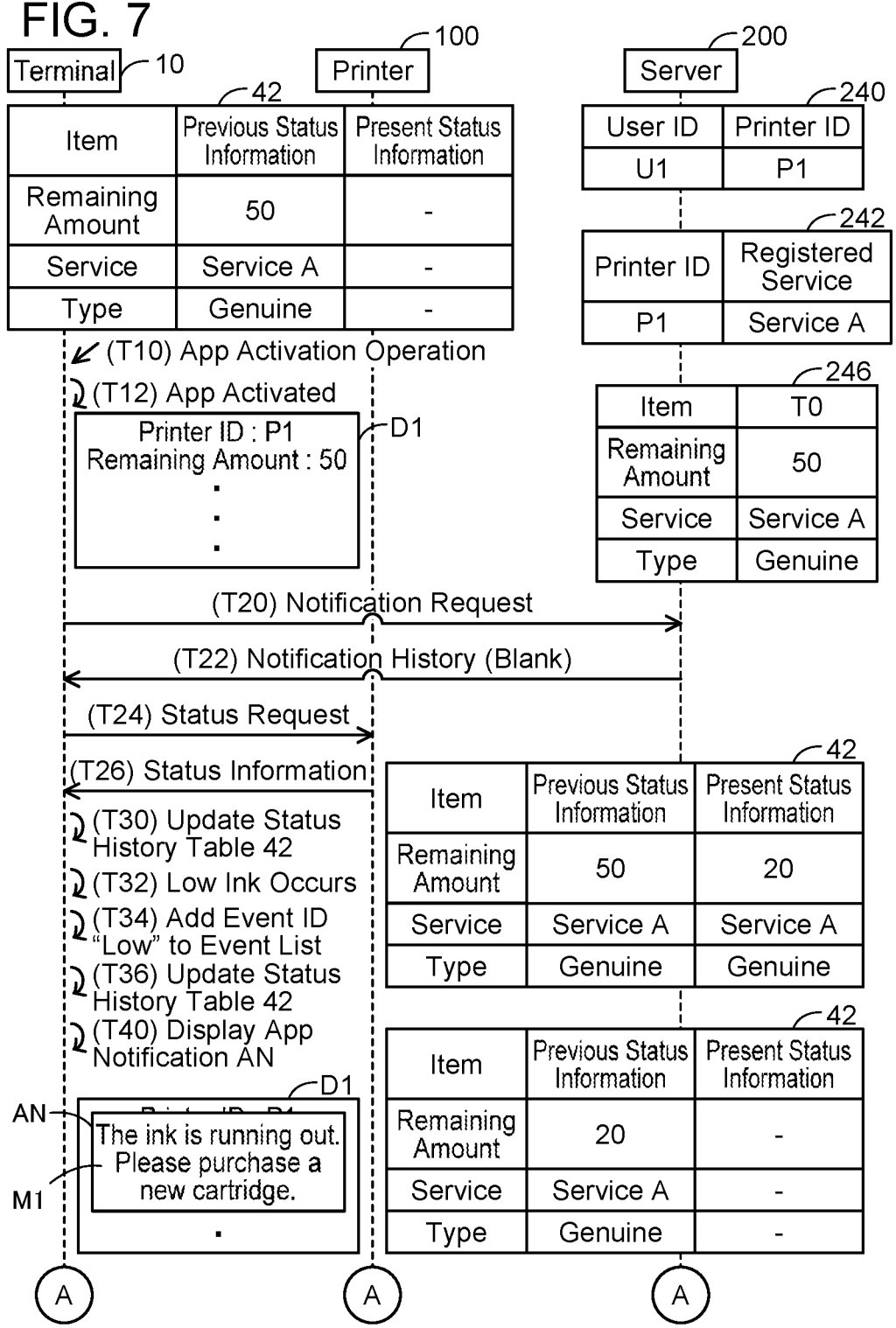
FIG. 7 illustrates a sequence diagram of a specific case.
Figure 8:
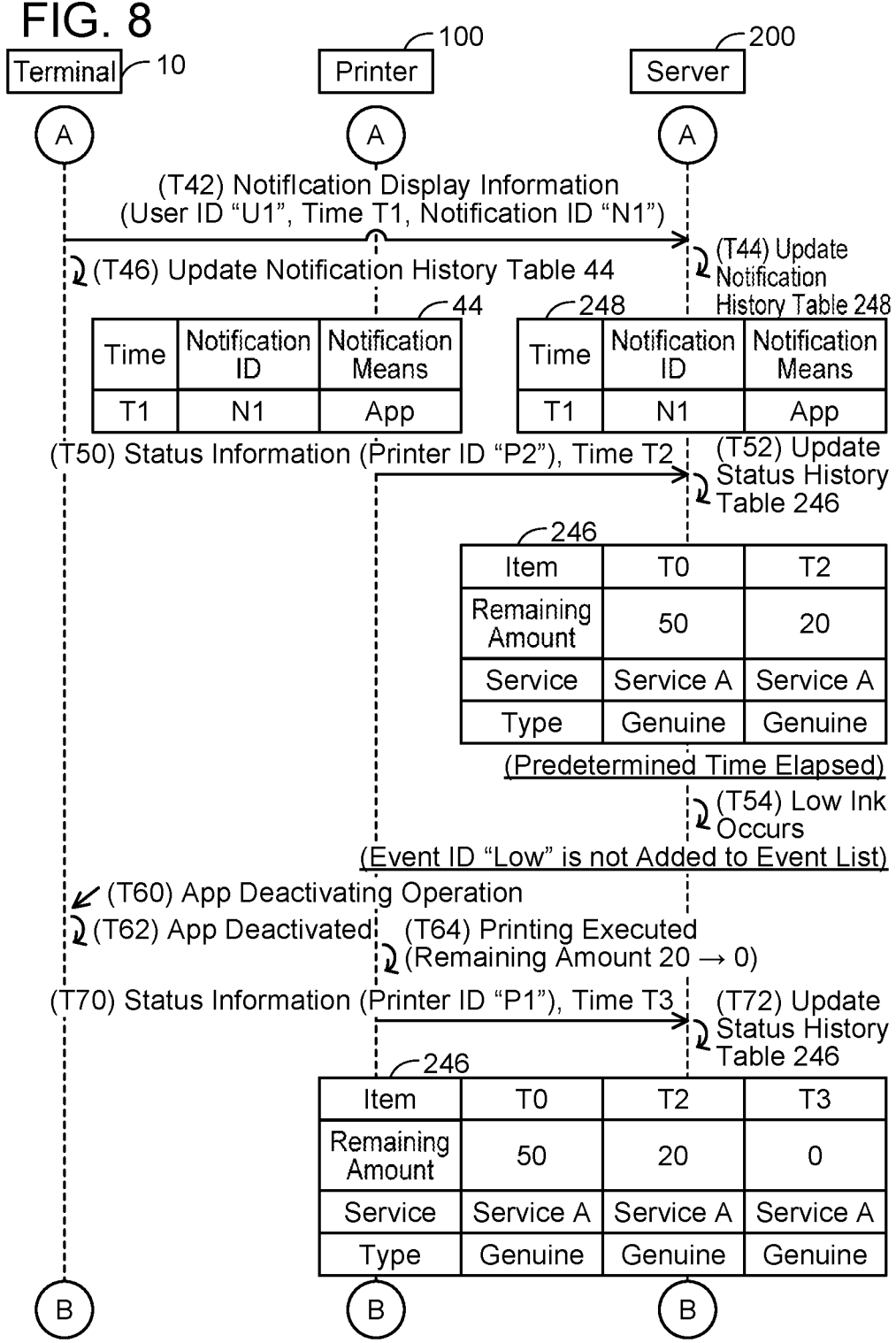
FIG. 8 illustrates a sequence diagram continued from FIG. 7.

(Specific Case; FIGS. 7 to 9)

Now referring to FIGS. 7 to 9, a specific case implemented by the processes of FIGS. 3 to 6 will be described. In the initial state of FIG. 7, the terminal 10 already stores remaining amount "50", service "Service A", and type "Genuine" as the previous status information but does not store the present status information yet in the status history table 42. Further, the server 200 already stores the user ID "U1" and the printer ID "P1" in association each other in the user table 240 as well as the printer ID "P1" and the registered service "Service A" in association with each other in the printer table 242. In addition, the server 200 already stores status information at time T0 (i.e., remaining amount "50", service "Service A", and type "Genuine") in the status history table 246. That is, in the initial state of FIG. 7, the terminal 10 and the printer 100 are already registered in the server 200. Especially, the printer 100 is already registered as a printer to receive the service "Service A".

In order to facilitate the understanding of the following description, steps performed by the CPUs (e.g., 32, 232) will be described with the devices (e.g., the terminal 10, the server 200) as the subjects of actions, not with the CPUs as the subjects of actions. Further, steps implemented by the CPU 32 executing the app 38 may be described with the app 38 as the subject of actions, instead of describing with the terminal 10 as the subject of actions.

When the terminal 10 accepts an app activation operation (e.g., an operation of tapping an icon of the app 38) from the user in T10, the terminal 10 activates the app 38 in T12. As a result, a home screen D1 of the app 38 is displayed on the display unit 14 by the app 38. The home screen D1 includes the printer ID "P1" of the printer 100 and the previous status information (e.g., remaining amount "50") in the status history table 42.

When the app 38 is activated in T12, the app 38 sends the server 200 a notification request to request the server 200 to send notification history in T20.

When receiving the notification request from the terminal 10 in T20, the server 200 sends notification history stored in the notification history table 248 to the terminal 10 in T22. Here, the notification history sent in T22 is blank since there is no information in the notification history table 248 at this time.

The app 38 receives the notification history from the server 200 in T22 (S10 in FIG. 3). In this instance, the app 38 stores the received notification history in the notification history table 44. Since the notification history received in T22 is blank, no information is stored in the notification history table 44 at this time.

When activated (T12), the app 38 sends the printer 100 a status request to request that status information be sent in T24.

When receiving the status request from the terminal 10 in T24, the printer 100 sends status information to the terminal 10 in T26. This status information includes remaining amount "20", service "Service A", and type "Genuine".

The app 38 receives the status information from the printer 100 in T26 (S12 in FIG. 3) and updates the status history table 42 in T30. Specifically, the app 38 stores the status information received from the printer 100 (i.e., remaining amount "20", service "Service A", and type "Genuine") in the status history table 42 as the present status information. Further, since the previous status information is already stored (YES in S14) in the present case, the app 38 performs the event determination process (S20 in FIG. 3) as follows.

The app 38 first specifies one event ID "Low" in the event table 40 (S40 in FIG. 4) and specifies the item "remaining amount" in the status history table 42. The app 38 then specifies, for the item "remaining amount", the previous status information "50" and the present status information "20" (S42). In this instance, the app 38 determines that the event "Low ink" has occurred in T32, since the previous status information does not satisfy the occurrence condition of the event "Low ink" and the present status information satisfies the occurrence condition of the event "Low ink" (YES in S44). Further, the app 38 determines that a push notification has not been executed yet for the event "Low ink" (NO in S46) since there is no information in the notification history table 44 (see T22). In this instance, the app 38 writes the event ID "Low" corresponding to the event "Low ink" into the event list in T34 (S48).

Then, the app 38 specifies another event ID "Empty" in the event table 40 (NO in S50, S40). In this instance, the app 38 determines that the event "ink Empty" has not occurred (NO in S44). Similarly, the app 38 determines that the events identified by the event IDs "NotGenuine" and "Service_In" have not occurred either.

After performing the event determination process above to all the event IDs in the event table 40 (i.e., the four event IDs "Low", "Empty", "NotGenuine", and "Service_In") (YES in S50), the app 38 updates the status history table 42 in T36 (S22 in FIG. 3). Specifically, the app 38 stores the present status information as the previous status information and deletes the present status information.

Since the event ID "Low" is on the event list (YES in S24), the app 38 displays an app notification AN on the display unit 14 in T40 (S30 in FIG. 3). Specifically, the app 38 displays the app notification AN over the home screen D1 which has been maintained since T12. The app notification AN includes a message M1 (e.g., a message "The ink is running out. Please purchase a new cartridge.") that is associated with the event ID "Low", which is on the event list, in the event table 40. By seeing the app notification AN, the user can be informed that he/she should purchase a new cartridge. The app 38 can perform a process for purchasing a new cartridge (e.g., a process of transitioning to a webpage for purchasing a new cartridge) in response to accepting selection of the app notification AN from the user, although this is not illustrated.

(Continuation from FIG. 7; FIG. 8)

The app 38 sends notification display information to the server 200 in T42 of FIG. 8 (S32 in FIG. 3). This notification display information includes the user ID "U1" of the terminal 10, the present time (i.e., the time when the app notification AN was displayed) T1, and a notification ID "N1" associated with the event ID "Low" in the event table 40.

When receiving the notification display information from the terminal 10 in T42 (YES in S110 of FIG. 5), the server 200 updates the notification history table 248 in T44 (S112). Specifically, the server 200 first specifies the printer ID "P1" associated with the user ID "U1" in the user table 240. The server 200 then stores the time T1 and the notification ID "N1", which are included in the received notification display information, and the notification means "App" in association with each other in the notification history table 248 corresponding to the printer 100 identified by the printer ID "P1".

The app 38 also updates the notification history table 44 in T46 (S34 in FIG. 3). Respective information stored here are the same as the respective information stored in the notification history table 248 by the server 200 in T44.

In response to the elapse of a 5-minute cycle, the printer 100 sends status information including the printer ID "P1" and the present time T2 to the server 200 in T50. This status information includes remaining amount "20", service "Service A", and type "Genuine". Further, the difference between the time T2 and the time T1 is less than 15 minutes.

When receiving the status information from the printer 100 in T50 (YES in S100 of FIG. 5), the server 200 updates the status history table 246 in T52 (S102). Specifically, the server 200 first specifies the printer ID "P1" included in the received status information. The server 200 then stores the time T2 and the plural pieces of information corresponding to the plural items included in the status information (i.e., remaining amount "20", service "Service A", and type "Genuine") in association with each other in the status history table 246 corresponding to the printer 100 identified by the specified printer ID "P1". As a result, as illustrated in FIG. 8, a column for the time T2 is added to the status history table 246.

After that, in response to the elapse of a predetermined time period (15 minutes in the present case) since the event determination process was performed last time at the server 200 (YES in S120), the server 200 performs the event determination process (S130).

Since the printer 100 is already registered as a printer to receive the service (YES in S140 of FIG. 6), the server 200 first determines whether an event is occurring. If the printer 100 is not registered as a printer to receive the service, whether an event is occurring is not determined (NO in S140, End). Thus, only in the case where the printer 100 is already registered as a printer to receive the service, the server 200 can send a push notification to the terminal 10.

The server 200 first specifies one event ID "Low" in the event table 244 (S142 in FIG. 6) and specifies the item "remaining amount" in the status history table 246. The server 200 then specifies, for the item "remaining amount", the status information at the time T0 (i.e., the previous status information) "50" and the status information at the time T2 (i.e., the present status information) "20" (S144). In this instance, the server 200 determines in T54 that the event "Low ink" has occurred (S144, YES in S150) since the previous status information does not satisfy the occurrence condition of the event "Low ink" and the present status information satisfies the occurrence condition of the event "Low ink". The server 200 then specifies the notification ID "N1" associated with the event ID "Low" in the event table 244. Since the time T1 which is 15 minutes before the present time, the specified notification ID "N1", and the notification means "App" are associated with each other in the notification history table 248, the server 200 determines that the app notification has been executed for the event "Low ink" (YES in S152). In this instance, the server 200 does not write the event ID "Low" intro the event list. Thus, a push notification is not executed for the event "Low ink" for which the app notification AN has been executed.

The server 200 further determines that the events identified by the other event IDs "Empty", "NotGenuine", "Service_In", and "Purchase10" in the event table 244 have not occurred (NO in S150).

As above, for the event "Low ink", the server 200 does not add the event ID "Low" into the event list even when determining that the event "Low ink" has occurred, after the app 38 displayed the app notification AN. That is, a push notification is not sent to the terminal 10 for the event "Low ink" for which the app notification AN has been executed. Thus, the display of push notification indicating the same contents as those of the app notification AN displayed at the terminal 10 can be suppressed. Convenience for the user of the terminal 10 is thus improved.

Thereafter, when the app 38 accepts an app deactivating operation for deactivating the app 38 from the user in T60 (YES in S36 of FIG. 3), the app 38 is deactivated in T62.

The printer 100 executes printing in T64. As a result, the ink remaining amount in the ink cartridge currently mounted in the printer 100 is decreased from "20" to "0".

Thereafter, in response to the elapse of a 5-minute cycle, the printer 100 sends status information and time T3 to the server 200 in T70. The status information sent in T70 is the same as the status information of T50 except that the remaining amount is "0".

When receiving the status information from the printer 100 in T70 (YES in S100 of FIG. 5), the server 200 updates the status history table 246 in T72. This update is the same as the update of T52 except that the time is T3 and the remaining amount is "0".

(Continuation from FIG. 8; FIG. 9)

Thereafter, in response to the elapse of the predetermined time period (15 minutes in the present case) since the event determination process was performed last time at the server 200 (i.e., the elapse of 15 minutes from the time T2) (YES in S120), the event determination process is performed (S130). Here, the time T3 is the time 15 minutes after the time T2. The event determination process, which has been specifically described above, is performed. As a result, the server 200 determines in T74 of FIG. 9 that the event "ink Empty" identified by the event ID "Empty" has occurred (YES in S144, S150). Further, the server 200 determines that the events identified by the other event IDs "Low ink", "NotGenuine", "Service_In", and "Purchase10" have not occurred (NO in S150). The server 200 then specifies a notification ID "N2" associated with the event ID "Empty" in the event table 244. Since the time 15 minutes before the present time, the specified notification ID "N2", and the notification means "App" are not associated with each other in the notification history table 248, the server 200 determines that an app notification has not been executed for the event "ink Empty" (NO in S152). In this instance, the server 200 writes the event ID "Empty" into the event list for the printer 100 in T76 (S154).

Since the event ID "Empty" is on the event list for the printer 100 (YES in S132 of FIG. 5), the server 200 sends a push notification to the terminal 10 in T80 (S134). The server 200 then updates the notification history table 248 in T82 (S136). Specifically, the server 200 stores the present time (i.e., the time when the push notification was sent) T3, the notification ID "N2", and the notification means "Push" in association with each other in the notification history table 248.

When receiving the push notification from the server 200 in T80, the app 38 displays the push notification PN on the display unit 14 in T84. In a modification, the OS 36 may display the push notification PN on the display unit 14 when receiving the push notification from the server 200. At the time of T80, the app 38 is not active. Thus, the push notification PN is displayed not over the screen displayed by the app 38 but over a home screen D2 displayed by the OS 36 (e.g., a screen indicating the time as illustrated in FIG. 9). The push notification PN includes a message M2 (e.g., a message "The ink has run out. Please purchase a new cartridge.") associated with the event ID "Empty" written in the event list for the printer 100. By seeing the push notification PN, the user can be informed that he/she should purchase a new cartridge even when the app 38 is not running. The terminal 10 can activate the app 38 in response to accepting selection of the push notification PN from the user, although this is not illustrated. The app 38 activated in this way can perform a process for purchasing a new cartridge (e.g., a process of transitioning to a webpage for purchasing a new cartridge).

Thereafter, the sequence same as the sequence from T10 to T26 in FIG. 7 is performed within 15 minutes from the time T3. As a result, the app 38 stores the time T1, the notification ID "N1", and the notification means "App" in association with each other as well as the time T3, the notification ID "N2", and the notification means "Push" in association with each other in the notification history table 44.

The app 38 updates the status history table 42 in T90. T90 is the same as T30 in FIG. 7 except that the remaining amount of the present status information indicates "0". After that, the event determination process (S20 in FIG. 3) is performed. This process has been specifically described above.

The app 38 determines in T92 that the event "ink Empty" has occurred (YES in S44 of FIG. 4). The app 38 then specifies the notification ID "N2" associated with the event ID "Empty" in the event table 40. Since the time T3 which is 15 minutes before the present time, the specified notification ID "N2", and the notification means "Push" are stored in association with each other in the notification history table 44, the app 38 determines that the push notification has been executed for the event "ink Empty" (YES in S46). In this instance, the app 38 does not write the event ID "Empty" corresponding to the event "ink Empty" into the event list. That is, an app notification is not displayed for the event "ink Empty" for which the push notification has been executed. Thus, the display of an app notification indicating the same contents as those of the push notification PN received from the server 200 at the terminal 10 can be suppressed. Convenience for the user of the terminal 10 is thus improved.

Effects of Embodiment

According to the configuration above, when receiving a push notification from the server 200 (T80 in FIG. 9), the terminal 10 displays the push notification PN (T82). In addition to this, when receiving status information from the printer 100, the terminal 10 displays the app notification AN (T26 to T40 in FIG. 7). Thus, the terminal 10 can display the push notification PN or the app notification AN when receiving information from either the server 200 or the printer 100.

Here, a first comparative example where only a push notification is executed is contemplated. In the first comparative example, the event determination process is performed at the server 200 (see S130 in FIG. 5, FIG. 6) even when the app 38 is not running in the foreground. As a result, a push notification is sent from the server 200 to the terminal 10 and the push notification is displayed at the terminal 10. However, since the event determination process at the server 200 is performed every predetermined time period (every 15 minutes in the present embodiment), a time lag may occur between the time when an event actually occurred at the printer 100 and the time when the push notification is displayed at the terminal 10.

Further, a second comparative example where only an app notification is executed is contemplated. In the second comparative example, the sequence from S12 to S34 in FIG. 3 is performed repeatedly while the app 38 is running in the foreground. That is, the app 38 can display the app notification in real time. However, the app 38 can receive status information from the printer 100 only while running in the foreground. In other words, the app 38 can display the app notification only while running in the foreground. Thus, the app notification is displayed in response to the app 38 being activated in the foreground after an event occurred at the printer 100. Therefore, a time lag may occur between the time when an event actually occurred at the printer 100 and the time when the app notification is displayed at the terminal 10.

On the other hand, in the present embodiment, both a push notification and an app notification are executed. Thus, the app 38 can display the app notification in real time while running in the foreground. Further, the terminal 10 can display the push notification in response to receiving the push notification from the server 200, even when the app 38 is not running. Thus, the terminal 10 can promptly display the notification (the push notification PN or the app notification AN). Convenience for the user of the terminal 10 is thus improved.

Further, according to the configuration above, the server 200 sends the push notification to the terminal 10 when receiving status information from the printer 100 without receiving the notification display information from the terminal 10 (T70, T72 in FIGS. 8, T74 to T80 in FIG. 9). As a result, the push notification PN is displayed at the terminal 10 (T84). On the other hand, the server 200 does not send the push notification PN to the terminal 10 when receiving status information from the printer 100 after receiving the notification display information from the terminal 10 (T42 to T54 in FIG. 8). Thus, the display of the push notification indicating the same contents as those of the app notification AN displayed at the terminal 10 can be suppressed. Convenience for the user of the terminal 10 is thus improved.

Further, according to the configuration above, the terminal 10 displays the app notification AN when receiving status information from the printer 100 without receiving the push notification from the server 200 (T26 to T40 in FIG. 7). On the other hand, the terminal 10 does not display the app notification when receiving status information from the printer 100 after the push notification PN has been displayed (T26, T90, T92 of FIG. 7 cited in FIG. 9). Thus, the display of the app notification indicating the same contents as those of the push notification PN displayed at the terminal 10 can be suppressed. Convenience for the user of the terminal 10 is thus improved.

The terminal 10 receives status information from the printer 100 only while the app 38 is running. Thus, the communication load of the terminal 10 and the printer 100 is reduced as compared to a configuration where the terminal 10 receives status information from the printer 100 even while the app 38 is not running. In a modification, the configuration where the terminal 10 receives status information from the printer 100 even while the app 38 is not running may be employed.

Further, the app 38 displays the app notification regardless of whether the printer 100 is registered as a printer to receive the service or not. Thus, the app notification regarding the printer 100 can be displayed without the user registering the printer 100 as a printer to receive the service. Convenience for the user is thus improved.

(Correspondence Relationships)

The terminal 10, the printer 100, and the server 200 are examples of "terminal device", "communication device", and "server", respectively. The app 38 is an example of "predetermined application program". Status information sent from the printer 100 to the server 200 (e.g., T50 in FIG. 8) and status information sent from the printer 100 to the terminal 10 (e.g., T26 in FIG. 7) are examples of "first history information" and "second history information", respectively. The push notification PN and the app notification AN are examples of "first notification information" and "second notification information", respectively. The remaining amount in status information indicating "20" or less (or "0") is an example of "satisfying a predetermined notification condition". The remaining amounts "20" and "0" are examples of "threshold". The notification display information sent in T42 is an example of "notification display information". The service "Service A" is an example of "predetermined service". The ink and ink cartridge are examples of "color material" and "consumable article (and cartridge)", respectively. The screens D1 and D2 are examples of "second screen" and "first screen", respectively.

The message M1 and the message M2 are examples of "message to prompt ordering the consumable article".

T50 in FIGS. 8 and T26 in FIG. 7 are examples of "send first history information" and "send second history information" by the "communication device", respectively. S134 in T5 and T80 in FIG. 8 are examples of "send first notification information" by the "server".

T84 in FIG. 9 is an example of "display the first notification information" by the "terminal device". S30 in FIGS. 3 and T40 in FIG. 7 are examples of "display second notification information" by the "terminal device" and the "application program". S32 in FIGS. 3 and T42 in FIG. 8 are examples of "send the notification display information" by the "terminal device". S12 in FIGS. 3 and T26 in FIG. 7 are examples of "receive the second history information" by the "terminal device".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) In addition to or instead of the remaining amount, service, and type, status information may include other information (e.g., the cumulative number of printed sheets at the printer, the duration of use of the printer, etc.). Generally speaking, the "first history information" and the "second history information" may be any information as long as they indicate usage history of the "communication device".

(Modification 2) The app 38 may omit S46 in FIG. 4. That is, the app 38 may display an app notification for an event occurred regardless of whether a push notification for the event has been executed or not. In another modification, the server 200 may omit S152 in FIG. 6. That is, the CPU 232 of the server 200 may display a push notification for an event at the terminal 10 regardless of whether an app notification for the event has been executed or not.

(Modification 3) The server 200 may omit S140 in FIG. 6. That is, the server 200 may perform the steps from S142 onward regardless of whether the printer 100 is registered as a printer to receive the service or not. In another modification, the app 38 may display an app notification only in the case where the printer 100 is registered as a printer to receive the service.

(Modification 4) Here, a situation is assumed where the printer 100 is registered as a printer to receive a service for which the user is charged according to the number of sheets printed at the printer 100 within a predetermined time period. In this situation, an ink cartridge is provided by the vendor of the printer 100 for free in response to a request from the user. In the present modification, the message M1 may read, for example, "The ink is running out. Please order a new cartridge". That is, in the present modification, this message is an example of the "message to prompt ordering the consumable article". In another modification, for example, a notification displayed when an event that the duration of use of the printer reaches a predetermined duration (e.g., 1000 days) occurs may include a message "The duration of use of the printer has exceeded 1000 days. It may be a good time to consider replacing the printer with a new one.". Generally speaking, the "first history information" and the "second history information" may not include information related to "consumable article mounted in the communication device". Further, the "first notification information" and the "second notification information" may include a message different from the "message to prompt ordering the consumable article".

(Modification 5) A push notification may be displayed over the screen D1 displayed by the app 38 or may be displayed over a screen displayed by a program different from both the OS 36 and the app 38. Generally speaking, "display the first notification information" by the "terminal device" may include displaying the "first notification information" over the "first screen" or displaying the "first notification information" over the "second screen".

(Modification 6) The event table 40 stored in the memory 34 by the app 38 may not be immutable information but may be information updated in the course of use of the app 38. Specifically, the app 38 may obtain an event list as well as notification history from the server 200 in S10 in FIG. 3. In the event table 244, the server 200 specifies one or more events for which the app 38 can perform the event determination process. For example, in the example of FIG. 2, the server 200 specifies four event IDs "Low", "Empty", "Not-Genuine" and "Service_In" in the event table 244. The event ID "Purchase10" (i.e., event "tenth purchase of cartridge") is not specified here. This is because the app 38 cannot determine this event has occurred or not since it does not manage the number of ink cartridge purchases. The server 200 then specifies the notification IDs and messages associated with the specified event IDs and may send these information as an event list to the terminal 10. As a result, the event table 40 may be updated by the app 38.

(Modification 7) The server 200 may store e-mail addresses in association with respective user IDs in the user table 240. In this instance, the server 200 may send an e-mail to the terminal 10, instead of a push notification, in S134 of FIG. 5. Specifically, the server 200 may specify a message associated with a listed event ID, the user ID "U1" associated with the printer ID "P1", and an e-mail address associated with the user ID "U1". The server 200 may then send the terminal 10 an e-mail that includes the specified e-mail address as a recipient address as well as the specified message. In the present modification, this e-mail is an example of the "first notification information".

(Modification 8) In connection with the embodiment above, an example where the user of the terminal 10 owns a single printer 100 has been described. That is, in the embodiment above, the app 38 performs the processes of FIGS. 3 and 4 for a single printer 100. In a modification, the user of the terminal 10 may own two or more printers and the app 38 may perform the processes of FIGS. 3 and 4 for each of the two or more printers. Especially, the terminal 10 may store the tables 40 to 44 for each of the two or more printers. In this instance, the app 38 may display, in S30, an app notification that includes one or more printer IDs identifying one or more printers in which an event has occurred on the display unit 14. In S32, the app 38 may send notification display information that further includes the one or more printer IDs to the server 200. In this instance, the server 200 may update the notification history table(s) 248 corresponding to the one or more printer IDs included in the notification display information in S112 of FIG. 5. In another modification, the user of the terminal 10 may own two or more printers and the app 38 may send notification display information that does not include any printer IDs to the server 200. The server 200 may store the notification history tables 248 corresponding to respective user IDs in the user table 240, instead of storing the notification history tables 248 corresponding to respective printers identified by the printer IDs in the printer table 242. The server 200 may then, when receiving the notification display information from the terminal 10, update the notification history table 248 corresponding to the user ID included in the notification display information.

(Modification 9) The notification history table 44 and the notification history table 248 may further store additional information in association with respective information. For example, a modification is assumed where a plurality of ink cartridges (e.g., ink cartridges corresponding to a plurality of colors including cyan, magenta, yellow, black, etc.) is mounted in the printer 100. In this modification, the app 38 and the server 200 may determine whether the event "Low ink" has occurred for each of the plurality of ink cartridges or may determine that the event "Low ink" has occurred at the printer 100 when the ink remaining amount in any one of the ink cartridges reaches 20% or less. Especially for the case where the determination on whether the event "Low ink" has occurred is made for each of the plurality of ink cartridges, the additional information may be information for specifying individual cartridges (e.g., colors). In this instance, the app 38 may send notification display information including the additional information to the server 200 in S32 of FIG. 3.

(Modification 10) In the embodiment above, the processes of FIGS. 3 to 9 are implemented by software such as the app 38, the program 236, etc., however, in a modification, at least one of these processes may be implemented by hardware such as a logic circuit, etc.

What is claimed is:

1. A communication system comprising:
   a communication device;
   a server; and
   a terminal device,
   wherein the communication device comprises a first controller, and
   the first controller is configured to:
   send first history information indicating usage history of the communication device to the server; and
   send second history information indicating usage history of the communication device to the terminal device,
   wherein the server comprises a second controller, and
   the second controller is configured to:
   in a case where the first history information is received from the communication device, send first notification information related to the first history information to the terminal device,
   wherein the terminal device comprises a display unit and a third controller, and
   the third controller is configured to:
   in a case where the first notification information is received from the server, display the first notification information on the display unit;
   in a case where the second history information is received from the communication device, display second notification information related to the second history information on the display unit; and
   in a case where the second notification information is displayed on the display unit, send notification display information indicating that the second notification information has been displayed on the terminal device to the server, wherein in a case where the first history information satisfying a predetermined notification condition is received from the communication device without receiving the notification display information from the terminal device, the second controller is configured to send the first notification information to the terminal device, wherein in a case where the first history information satisfying the predetermined notification condition is received from the communication device after the notification display information has been received from the terminal device, the first notification information is not sent to the terminal device, wherein in a case where the second history information satisfying the predetermined notification condition is received from the communication device without receiving the first notification information from the server, the third controller is configured to display the second notification information on the display unit, and wherein in a case where the second history information satisfying the predetermined notification condition is received from the communication device after the first notification information has been displayed on the display unit, the second notification information is not displayed on the display unit.

2. The communication system as in claim 1, wherein
the terminal device comprises a predetermined application program for displaying the second notification information on the display unit, and
the third controller is further configured to, in a situation where the predetermined application program is running, receive the second history information from the communication device, wherein in a situation where the predetermined application program is not running, the second history information is not received.

3. The communication system as in claim 1, wherein
in a case where the first history information is received from the communication device in a situation where a predetermined service for the communication device is provided to the communication device, the second controller is configured to send the first notification information to the terminal device, and
in a case where the first history information is received from the communication device in a situation where the predetermined service for the communication device is not provided to the communication device, the first notification information is not sent to the terminal device.

4. The communication system as in claim 3, wherein
in the case where the second history information is received from the communication device, the third controller is configured to display the second notification information on the display unit regardless of whether the predetermined service for the communication device is provided to the communication device.

5. The communication system as in claim 1, wherein
each of the first history information and the second history information includes information related to a consumable article mounted in the communication device.

6. The communication system as in claim 5, wherein
each of the first notification information and the second notification information includes a message to prompt ordering the consumable article.

7. The communication system as in claim 5, wherein
the communication device is a printer configured to execute printing by using a color material,
the consumable article is a cartridge that contains the color material,
in a case where the first history information satisfying a predetermined notification condition is received from the communication device, the second controller is configured to send the first notification information to the terminal device,
in a case where the second history information satisfying the predetermined notification condition is received from the communication device, the third controller is configured to display the second notification information on the display unit, and
in a case where a remaining amount of the color material in the consumable article is equal to or less than a threshold, the predetermined notification condition is satisfied.

8. The communication system as in claim 1, wherein
the terminal device comprises a predetermined application program for displaying the second notification information on the display unit,
in a case where the first notification information is received from the server, the third controller is configured to display the first notification information over a first screen, wherein the first screen is displayed by a program different from the predetermined application program, and
in a case where the second history information is received from the communication device, the third controller is configured to display the second notification information over a second screen, wherein the second screen is displayed by the predetermined application program.

9. The communication system as in claim 8, wherein
the predetermined application program is further for displaying the first notification information on the display unit.

10. A non-transitory computer-readable recording medium storing computer-readable instructions for a server,
wherein the computer-readable instructions, when executed by a processor of the server, cause the server to:
in a case where first history information indicating usage history of a communication device is received from the communication device, send first notification information related to the first history information to a terminal device,
wherein in a case where the first history information satisfying a predetermined notification condition is received from the communication device without receiving notification display information from the terminal device, the first notification information is sent to the terminal device,
in a case where the first history information satisfying the predetermined notification condition is received from the communication device after the notification display information has been received from the terminal device, the first notification information is not sent to the terminal device, and
the notification display information is sent from the terminal device to the server in a case where second notification information related to second history information is displayed on the terminal device in response to second history information being sent from the communication device to the terminal device, wherein the second history information indicates usage history of the communication device and satisfies the predetermined notification condition.

11. A non-transitory computer-readable recording medium storing an application program including computer-readable instructions for a terminal device, wherein the terminal device comprises:

a display unit; and
a processor,
wherein in a case where first notification information is received from a server, the terminal device displays the first notification information on the display unit,
the first notification information is sent from the server to the terminal device in response to first history information being sent from a communication device to the server, wherein the first history information indicates usage history of the communication device and satisfies a predetermined notification condition,
wherein the computer-readable instructions, when executed by the processor, cause the terminal device to:
in a case where second history information indicating usage history of the communication device is received from the communication device, display second notification information related to the second history information on the display unit,
wherein in a case where the second history information satisfying the predetermined notification condition is received from the communication device without receiving the first notification information from the server, the second notification information is displayed on the display unit, and
in a case where the second history information satisfying the predetermined notification condition is received from the communication device after the first notification information has been displayed on the display unit, the second notification information is not displayed on the display unit.

* * * * *